United States Patent
Choi et al.

(10) Patent No.: US 9,401,017 B2
(45) Date of Patent: Jul. 26, 2016

(54) SYSTEMS AND METHODS FOR SEMI-AUTOMATED SEGMENTATION OF MEDICAL IMAGES

(71) Applicants: Kwang Won Choi, Madison, WI (US); Chihwa Song, Madison, WI (US); Richard Kijowski, Verona, WI (US); Darryl Gerard Thelen, Madison, WI (US)

(72) Inventors: Kwang Won Choi, Madison, WI (US); Chihwa Song, Madison, WI (US); Richard Kijowski, Verona, WI (US); Darryl Gerard Thelen, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 47 days.

(21) Appl. No.: 14/269,598

(22) Filed: May 5, 2014

(65) Prior Publication Data
US 2015/0317790 A1  Nov. 5, 2015

(51) Int. Cl.
| | |
|---|---|
| G06K 9/00 | (2006.01) |
| G06T 7/00 | (2006.01) |
| G06K 9/48 | (2006.01) |
| G06K 9/46 | (2006.01) |
| G06K 9/52 | (2006.01) |

(52) U.S. Cl.
CPC ............ *G06T 7/0012* (2013.01); *G06K 9/468* (2013.01); *G06K 9/48* (2013.01); *G06K 9/52* (2013.01); *G06T 7/0081* (2013.01); *G06K 2009/4666* (2013.01)

(58) Field of Classification Search
None
See application file for complete search history.

(56) References Cited

U.S. PATENT DOCUMENTS

| | | | | |
|---|---|---|---|---|
| 2006/0062442 | A1* | 3/2006 | Arnaud | A61B 6/505 382/128 |
| 2007/0167699 | A1* | 7/2007 | Lathuiliere | G06T 7/0089 600/407 |
| 2009/0060308 | A1* | 3/2009 | Dawant | G06T 7/0028 382/131 |

OTHER PUBLICATIONS

Ahmed, et al., A Modified Fuzzy C-Means Algorithm for Bias Field Estimation and Segmentation of MRI Data, IEEE Transactions on Medical Imaging, 2002, 21(3):193-199.

Canny, A Computational Approach to Edge Detection, IEEE Transactions on Pattern Analysis and Machine Intelligence, 1986, PAMI-8(6):679-698.

Folkesson, et al., Segmenting Articular Cartilage Automatically Using a Voxel Classification Approach, IEEE Transactions on Medical Imaging, 2007, 26(1):106-115.

* cited by examiner

*Primary Examiner* — Weiwen Yang
(74) *Attorney, Agent, or Firm* — Quarles & Brady, LLP

(57) ABSTRACT

Systems and methods for segmenting a medical image are provided. In some embodiments, the method includes receiving an image acquired from at least a portion of a subject's anatomy, selecting a first point within a target structure identified on the image, and determining a second and a third point associated with extents of a target biological tissue, the first, second and third points defining a sector described by the first point, a central angle and a subtended arc. The method also includes determining a plurality of arc points along the subtended arc, and extending a plurality of linear segments along directions determined by the first point and the plurality of arc points. The method further includes determining an intensity profile along each linear segment to identify boundaries of the target biological tissue, and generating a contour of the target biological tissue using the identified boundaries.

22 Claims, 8 Drawing Sheets

SYSTEMS AND METHODS FOR SEMI-AUTOMATED SEGMENTATION OF MEDICAL IMAGES

STATEMENT REGARDING FEDERALLY SPONSORED RESEARCH

This invention was made with government support under AR062733 awarded by the National Institutes of Health. The government has certain rights in the invention.

BACKGROUND

The present disclosure relates to systems and methods for medical imaging, and more specifically, to systems and methods for segmentation of medical images.

Magnetic resonance ("MR") imaging provides a higher resolution alternative to radiography for visualization of soft tissues for purposes of diagnosis and tracking of disease. In particular, MR images can be used to assess joint degeneration in clinical practice and osteoarthritis ("OA") research studies. For example, three-dimensional maps of knee joints providing pixel-wise measurements of cartilage thickness may be used to assess disease-related and treatment-related changes in cartilage over time.

Traditional approaches for segmentation of biological tissues include manual contouring of several structures over multiple image sets. Specifically, to obtain quantitative measures of cartilage thickness of a knee joint from MR images, for example, the bone-cartilage interface and cartilage surface boundary needs to be segmented over the entire articulating surface. However, such manual segmentation is extremely time-consuming, and its efficiency and reproducibility is influenced by the level of human expertise.

Hence, it would be desirable to have systems and methods capable of semi-automated and fully-automated segmentation of biological tissues in an expedient and accurate fashion for purposes of medical analysis, such as diagnosis and tracking of OA progression via articular cartilage measures.

SUMMARY

The present disclosure provides systems and methods for semi-automated segmentation of magnetic resonance ("MR") images. In particular, a reproducible and time-effective segmentation process is provided that and facilitates construction of geometries, including three dimensional ("3D") geometries, of target biological tissues, such as articular joint tissues, from high resolution MR images.

In accordance with one aspect of the disclosure, a system is provided for segmenting a medical image. The system includes an input configured to receive medical image data acquired from at least a portion of a subject's anatomy and at least one processor. The processor is configured to accept a user selection, from the input, for a first point within a target structure identified on the image, and a second and a third point associated with extents of a target biological tissue, the first, second, and third points defining a sector described by the first point, a central angle, and a subtended arc. The processor is also configured to determine a plurality of arc points along the subtended arc, extend a plurality of linear segments along directions determined by the first point and the plurality of arc points, and determine an intensity profile along each linear segment to identify boundaries of the target biological tissue. The processor is further configured to generate a contour of the target biological tissue using the identified boundaries. The system also includes an output configured to display information related the contour of the target biological image.

In accordance with another aspect of the disclosure, a method for segmenting a medical image is provided. The method includes receiving an image acquired from at least a portion of a subject's anatomy, identifying a first point within a target structure identified on the image, and identifying a second and a third point associated with extents of a target biological tissue, the first, second and third points defining a sector described by the first point, a central angle and a subtended arc. The method also includes determining a plurality of arc points along the subtended arc, and extending a plurality of linear segments along directions determined by the first point and the plurality of arc points. The method further includes determining an intensity profile along each linear segment to identify boundaries of the target biological tissue, and generating a contour of the target biological tissue using the identified boundaries.

In accordance with another aspect of the disclosure, a non-transitory, computer-readable storage medium is provided having stored thereon instructions that, when executed by a computer processor, cause the computer processor to generate a medical image. The processor is caused to carry out steps of receiving image data acquired from at least a portion of a subject's anatomy and, using the image data, denoting a first point within a bony structure. The processor is also caused to carry out steps of using the image data, denoting a second and a third point associated with extents of an articular joint tissue, the first, second, and third points defining a sector described by the first point, a central angle, and a subtended arc. The processor is further caused to carry out steps of determining a plurality of arc points along the subtended arc, extending a plurality of linear segments along directions determined by the first point and the plurality of arc points, and determining an intensity profile along each linear segment to identify boundaries of the articular joint tissue. The computer processor is caused to carry out steps of generating at least one medical image of the subject indicating at least a contour of the articular joint tissue using the identified boundaries.

The foregoing and other advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION

Figure 1:
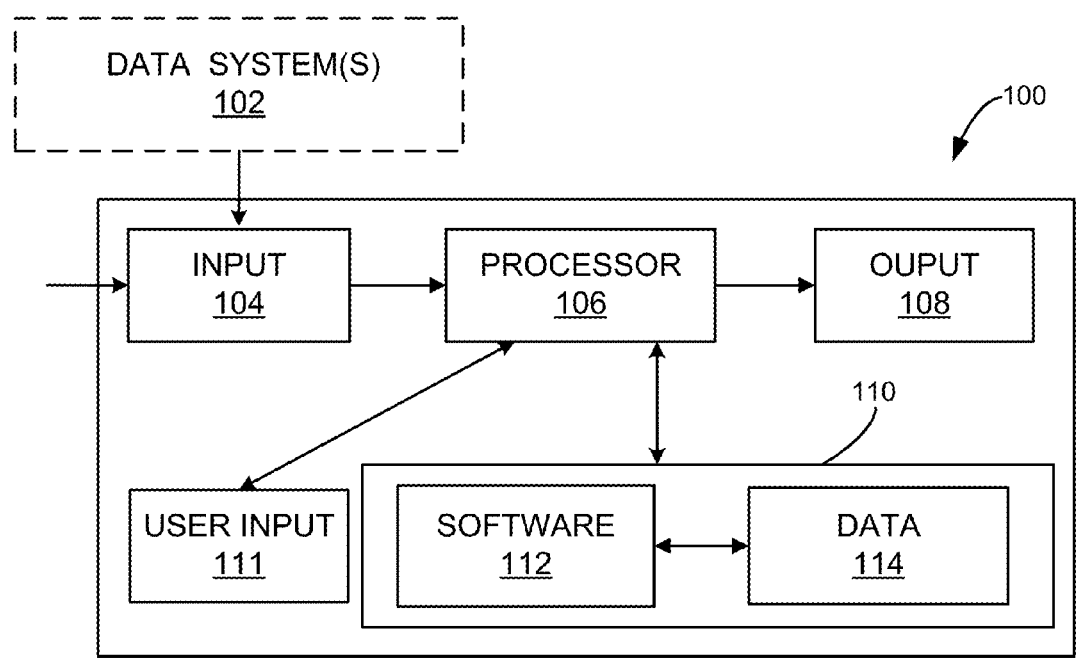
FIG. 1 is a schematic illustration of system for image processing in accordance with the present disclosure.

In practice, it remains challenging to segment the 3D cartilage tissue regions in medical images. Segmentation is important for measuring cartilage thickness over the entire articulating surface. The segmented cartilage also serves as a mask for identifying cartilage regions where quantitative image metrics, such as T1-rho and T2 in MR images, can be extracted. Traditionally, this is done by having end users scroll through stacks of images and manually identify cartilage tissue. However, such a manual segmentation approach is an extremely time-consuming process. Furthermore, the precision of cartilage volumes developed based on this method has been questioned because the efficiency and repeatability of segmentation are based on the level of human expertise.

Alternatively, computer-assisted segmentation techniques could enhance the use of MRI for evaluating cartilage health, while reducing user time and providing repeatable quantitative assessments. In recent years, there have been a series of advances in MRI segmentation for the quantitative assessment of cartilage volume in longitudinal clinical studies. Specifically, several fully-automatic segmentation methods have been developed. For example, proposed methods have included automatically segmenting the knee cartilage using the atlas-based approach, whereby an atlas database is built from knee MR images of healthy subjects, and segmentation is conducted based on the database. Other automatic cartilage segmentation methods are based on the active shape model ("ASM") approaches. Specifically, these include statistical models of objects initially constructed based on rough shapes from a training set of triangulated surface representations, and iteratively deformed to fit within the boundary of cartilage. However, both the atlas and ASM-based methods rely on a priori knowledge of healthy anatomical shapes. As a result, images containing diseased or non-standard shapes would be more difficult to segment. Specifically, a higher computation cost would be required since such automated segmentation methods necessitate access to pre-stored databases of healthy shapes and perform a continuous comparison between a currently detected cartilage volume and pre-stored volumes.

In addition to automated methods, several semi-automated segmentation methods have been also developed that require various degrees of user interaction. For example, some methods utilize "region growing" techniques to segment cartilage, whereby neighboring points of initial seed points are examined based on specific criteria to determine whether they should be added to a target region. Other methods utilize an "active contour" approach, where computer-generated curves are moved within images, minimizing energy parameters to find target boundaries. One semi-automated method uses an "active shape model," similar to the fully automated ASM method, except that the initial rough shapes are built by user. Aforementioned methods commonly allow initial user-defined contours to expand to fit in boundaries of cartilage without need for prior knowledge of anatomical shape.

Other approaches utilized include "live wire" methods which allows a user to select regions of interest using simple mouse clicks. Specifically, a user sets the starting point by selecting a specific image pixel and as a cursor is moved over other pixels, the smallest cost path is identified from the starting point to the current location of the cursor, and modified if the cursor is moved.

Some have also utilized "edge detection" methods to segment cartilage regions in medical images. These approaches rely on deciding whether pixels are an edge or not, and include spatial frequency filtering, application of gradient operators, functional approximations, line and curve fitting techniques. In addition, other semi-automated segmentation method for detecting cartilage boundaries are performed using superimposition of different images, such as MR images acquired using different pulse sequences. However, such approaches are more time-consuming and hence not practical for clinical use.

The present disclosure recognizes that semi-automated algorithms tend to provide similar, or improved, accuracy and reproducibility, with faster times, less effort, and less need for expertise, as compared with manual segmentation methods. However, most of the above-mentioned semi-automated approaches would find it very difficult, for example, to detect the anterior beginning point and posterior ending point of cartilage boundary in sagittal MR images of a knee without prior knowledge of the knee shape. As a result, clinical use of MRI and semi-automated segmentation methods for diagnosing early stage OA is not seen in practice.

The present disclosure provides systems and methods that implement a semi-automated segmentation technique that does not require complex of extensive user input, and improves accuracy and reproducibility when contouring target biological tissues. Such systems and methods may be particularly advantageous for tissues, such as an articular joint tissues, that are difficult to delineate accurately using automated algorithms, and involve a time-consuming process via manual contouring. As will be described, the approach provided by the present disclosure allows a user to select a few specific points in a medical image acquired from a subject, and using image intensity profiles along linear projections generated using the selected points, boundaries of target biological tissues can be determined. Volume contours of segmented tissues may then be constructed by processing a series of image slices.

Turning to FIG. 1, a block diagram is shown of an exemplary system 100 for use in segmentation of medical images gathered from a subject, in accordance with the present disclosure. The system 100 may generally be in communication with or be capable of receiving information or image data from any data system(s) 102, including a magnetic resonance imaging ("MRI") system or other medical imaging or a data and/or image storage system. The system may include an input 104, a processor 106, an output 108, a memory 110, and a user interface 111. The system 100 may be, for example, a workstation, a notebook computer, a personal digital assistant (PDA), a multimedia device, a network server, a mainframe or any other general-purpose or application-specific computing device. The system 100 may operate autonomously or semi-autonomously, or may read executable software instructions from a computer-readable medium (such as a hard drive, a CD-ROM, flash memory and the like), or may receive instructions from a user, or any another source logically connected to computer or device, such as another networked computer or server. Thus, the input 104 may be represent a variety of inputs for receiving data from a variety of sources and/or include general communications connections or other means of receiving or communicating information.

The user input 111 may be configured in any shape or form, as desired, for operation of the system 100, and include the ability for accepting any kind of user input or data, such as medical image data. In some aspects, the input 111 may allow for a user selection of any number of parameters, including any number of points, lines, squares, rectangles, circles, and other shapes, in relation to portions, elements or features present in displayed medical image(s). For example, a user may be able to select, and/or modify, points or structures that are hard to be accurately identified using automated methods, such as an anterior beginning point and a posterior ending point corresponding to a sagittal view of a knee cartilage. In this manner, a user may utilize the user input 111 to select initial contours to be used by the processor 106 in a semi-automated segmentation approach, as will be described. In addition, the user input 111 may also be configured to allow a user to manipulate or adjust segments or contours generated by the system 100.

Although the processor 106 may be a commercially-available processor or part of a commercially-available computer system, along with performing any number of processing steps associated with operation of the system 100, the processor 106 may be configured to process, segment, or filter medical image data received, including MRI data. For instance, the processor 106 may be capable of constructing and displaying, via the output 108, any number of images using the image data received.

In some configurations, the processor 106 may be designed to perform any number of pre-processing steps. For example, the processor 106 may be capable of identifying signals associated with any user-selected or computed region, feature or structure, in a medical image and mask, modify, reduce or remove such signals. Specifically, the processor 106 may be capable of performing autonomous or semi-autonomous segmentation steps for the purpose of identifying target regions, features or structures in the image, and subsequently enhancing, or modifying, a contrast in the image. For example, the processor 106 may be capable of identifying regions, or structures using a geodesic active contour segmentation method based on geodesic or minimal path computations. As mentioned, geodesic active contour approaches rely on user input to identify initial contours in target regions or structures, such as bony structures, and an algorithm performed by processor 106 determines which pixels neighboring the contours are added to the selected regions. Such process is iterated by the processor 106 a number of times until an exit criteria is fulfilled, such as until a boundary or boundaries are encountered, for instance, a boundary between bone and cartilage. Interference signals associated with regions or structures identified in this manner, may then be masked, reduced or removed from the image. For example, a region of bone in an MR image may be removed to enhance detection of the cartilage boundary.

The processor 106 may also be designed to perform a pre-processing step whereby undesired noise signals, associated with features or structures in a medical image, are reduced or removed. For example, in some situations it may be desirable to eliminate noise around a boundary between structures in an image, such as a bone-cartilage boundary. As such, the processor 106 may be configured to apply, for example, a fuzzy C-means ("FCM") algorithm, or any other cluster-based algorithm, to filter the image(s) and remove the noise using any pre-determined or user-specified criterion. Specifically applying a FCM filter to medical image(s) received or constructed by the processor 106 allows the intensity of pixels in the image(s) to be influenced by their respective neighboring pixels that have similar intensity values, thus effectively sharpening targeted boundaries.

Other pre-processing steps that may be performed by the processor 106 may include applying an edge detection method. Specifically, edge detection is process in digital image processing, mostly utilized in the areas of feature recognition. Therefore, in some aspects, the processor 106 may also be designed to identify or enhance boundaries or edges present in the received or constructed medical image(s). For instance, the processor 106 may be configured to apply a Canny edge-detection technique, which is mathematical image processing method that aims at recognizing points, lines or regions in a digital image at which the pixel intensity changes suddenly, or more formally, has discontinuities. Locations at which image pixel intensity changes suddenly are usually organized into a set of curved line segments or edges. In this manner, changes in material properties may be captured. For example, such image processing algorithm may facilitate detection of cartilage regions in an MR image since regions of collagen included in cartilage are brighter in appearance on MR images than any other tissue due to a higher proportion of water present.

In some embodiments, the processor 106 may be configured to perform a number of processing steps to generate a contour or contours of a target biological tissues, such as an articular joint tissues. Examples of articular joint tissues include femoral cartilage, tibial cartilage, patellar cartilage, and so forth. In particular, based on a user selection of points, the processor 106 may be configured to generate contours of target biological tissues using a radial projection approach, in accordance with the present disclosure. As will be described, the processor 106 may be configured to extend linear segments along directions determined using the selected points and track image pixel intensities along the linear segments to determine inner and outer boundaries of the target biological tissues. In this manner, the processor 106 may generate any number of contours, that may be combined to create a three-dimensional ("3D") volume of the target biological tissue(s). For example, the processor 106 may be configured to generate 3D volumes using the generated two-dimensional ("2D") contours using a surface topography approach that may include fitting non-uniform rational basis spline ("NURBS") surfaces to the 2D contours.

The output 108 may take a variety of shapes or forms, as desired, and may include a visual and/or audio system, and be configured for displaying, raw or processed medical images. For example, the output 108 may be configured to display 2D or 3D images, such as MR images. In some aspects, the output 108 may be capable of generating and displaying overlays of images, segments, and contours in accordance with the present disclosure. In addition, the output 108 may be configured to provide any information in relation to regions, features or structures present in the images. For example, the output 108 may provide any indication in relation to size, length, thickness, area, volume, and so on, of any structure or tissue, segmented in accordance with the present disclosure.

The memory 110 may be a non-transitive or non-transitory, computer-readable storage medium and may contain software 112 and data 114, and may be configured for storage and retrieval of image processing information and data to be processed by the processor 106. In some aspects of the invention, the software 112 may contain instructions directed to performing medical image processing, as described, for detection, filtering, or segmentation of target biological tissue(s). In other aspects of the invention, the data 114 may take the form of MR image data.

Figure 2:
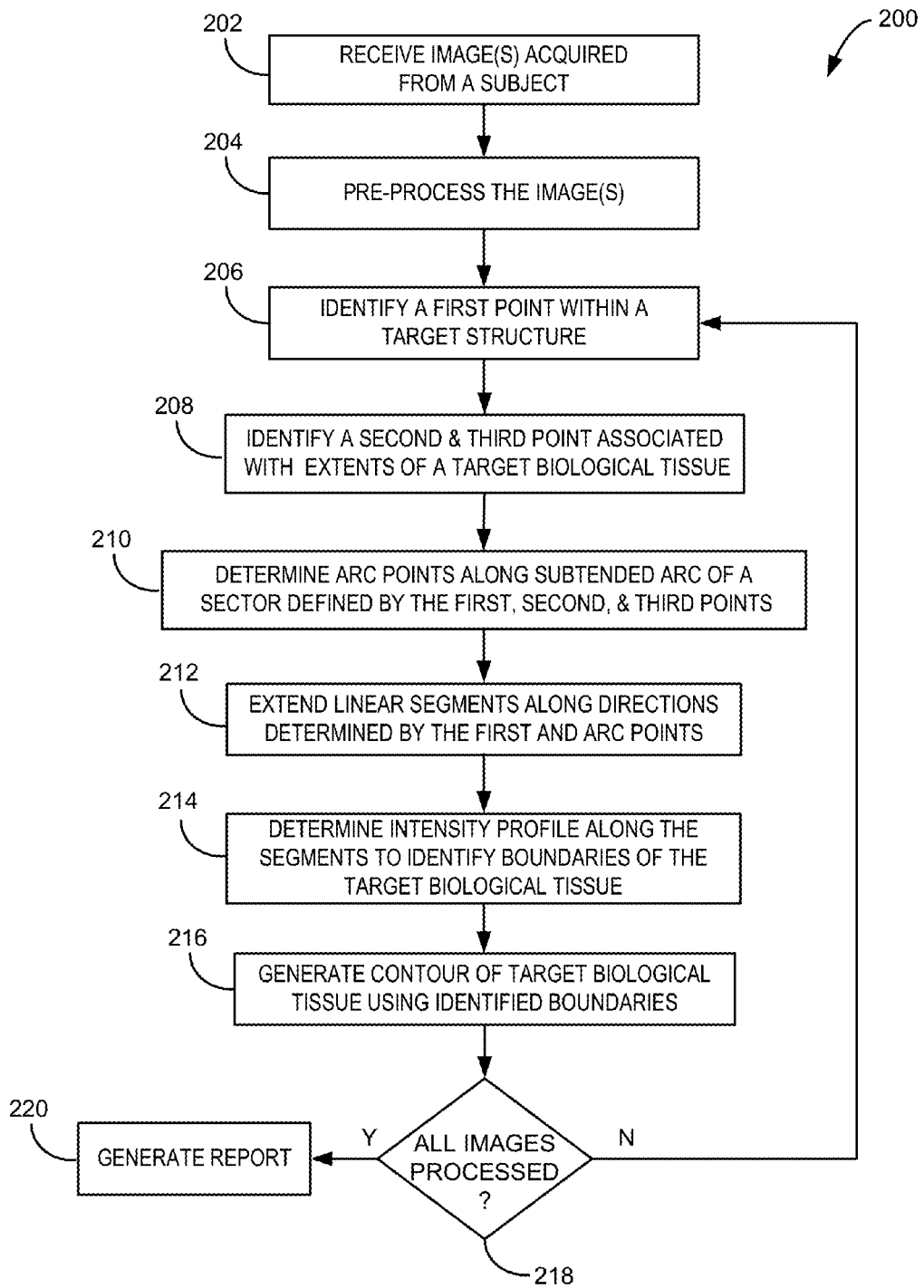
FIG. 2 is a flowchart illustrating steps of a process in accordance with the present disclosure.

Turning to FIG. 2, a flowchart illustrating steps of a process 200 in accordance with the present disclosure is shown. The process begins with process block 202 where images constructed from image data acquired from at least a portion of a subject's anatomy are received. The images may be pre-processed at process block 204. In some aspects, the images may be pre-processed to increase a desired image contrast, such as a bone-cartilage contrast. For example, a geodesic active contour technique may be applied, as described, to identify and subsequently mask interfering signals from target structures, such as bony structures, in order to more clearly discriminate target biological tissues, such as articular joint tissue, or cartilage.

Figure 3:
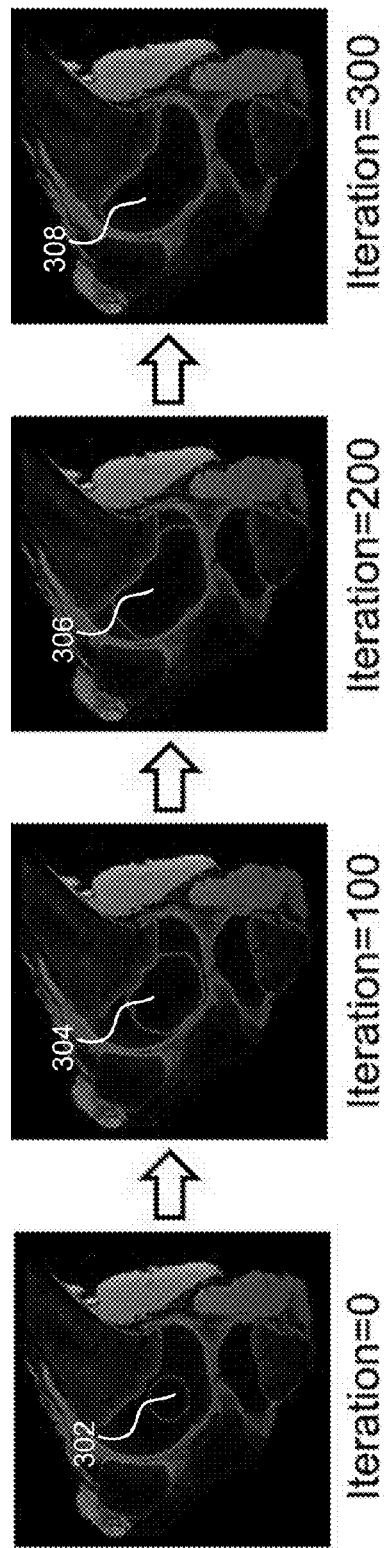
FIG. 3 is a graphical illustration of a geodesic active contour segmentation method.

Referring particularly to FIG. 3, application of a geodesic active contour technique is illustrated with respect to an image of a knee. As described, a user selects a rough first contour 302, or seed points defining the first contour, within a target structure, such as a femoral bone, and the algorithm performs a number of iterations that expands the first contour 302 such that a number of intermediate contours, for example contours 304, 306 shown in FIG. 3, are created. The iterative expansion process finishes when an exit criteria is fulfilled, such as a contour or contour portion encountering a boundary or boundaries, resulting in a final contour 308 encompassing the target structure. As such, masking, reducing or removing of interference signals present in the final contour 308 may modify or enhance the image contrast.

Figure 4:
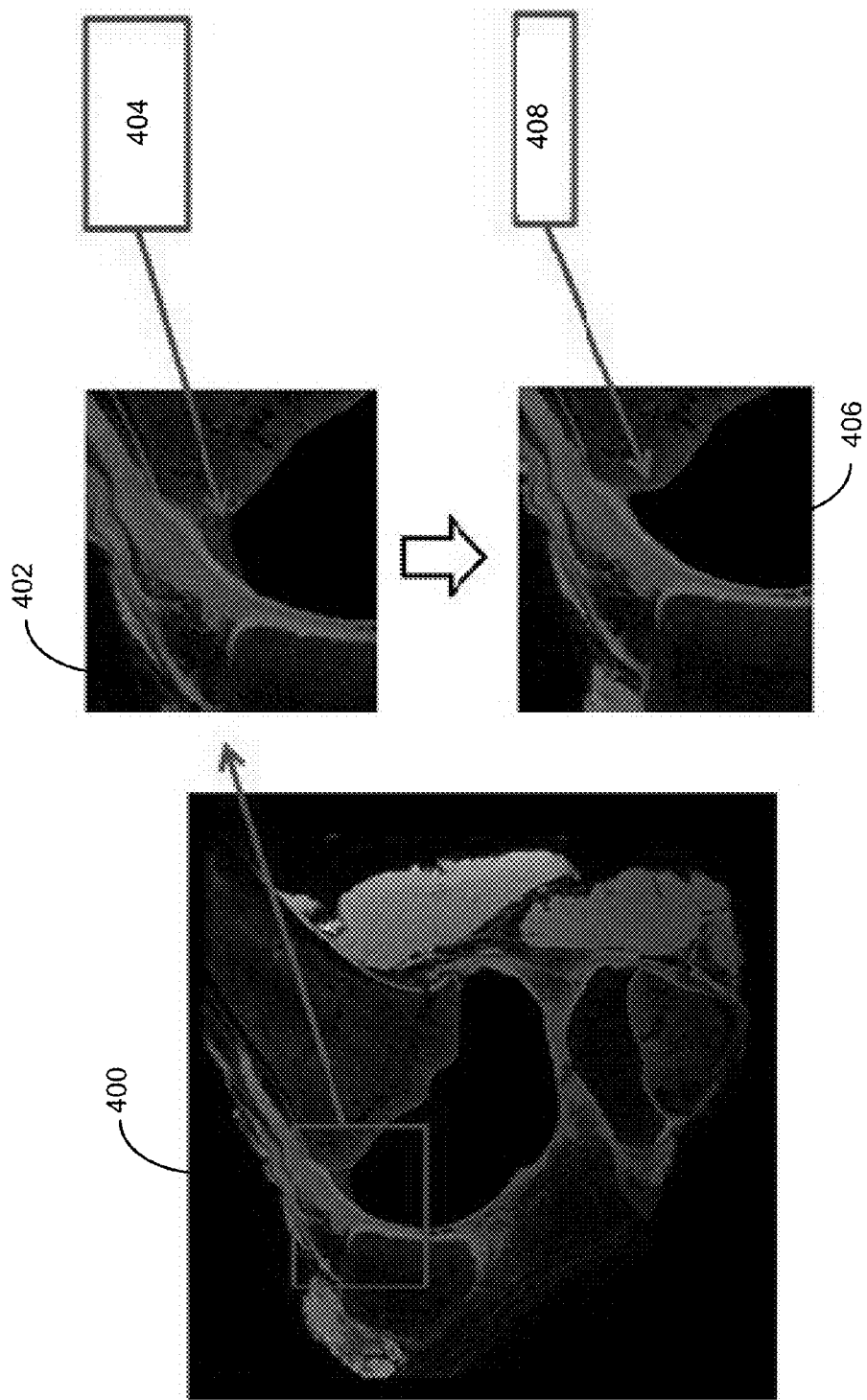
FIG. 4 is a graphical illustration of application of a fuzzy c-means filter method.

In other aspects, images may be further pre-processed at process block 204 to reduce or eliminated undesired noise signals. Specifically, to eliminate noise around a cartilage boundary, a fuzzy C-means ("FCM") algorithm, as described in the reference by M. N. Ahmed et. al. ("A Modified Fuzzy C-Means Algorithm for Bias Field estimation and Segmentation of MRI Data" IEEE, 2002), can be applied to sharpen targeted boundaries. For example, FIG. 4 illustrates how a FCM process can be used to process a large image 400. As shown in a sub-portion 402 of the large image 400, remaining noise as generally designated at 404 can be seen. However, following further application of an FCM process at sub-portion 406, the noise is cleared, as generally designated at 408.

Figure 5:
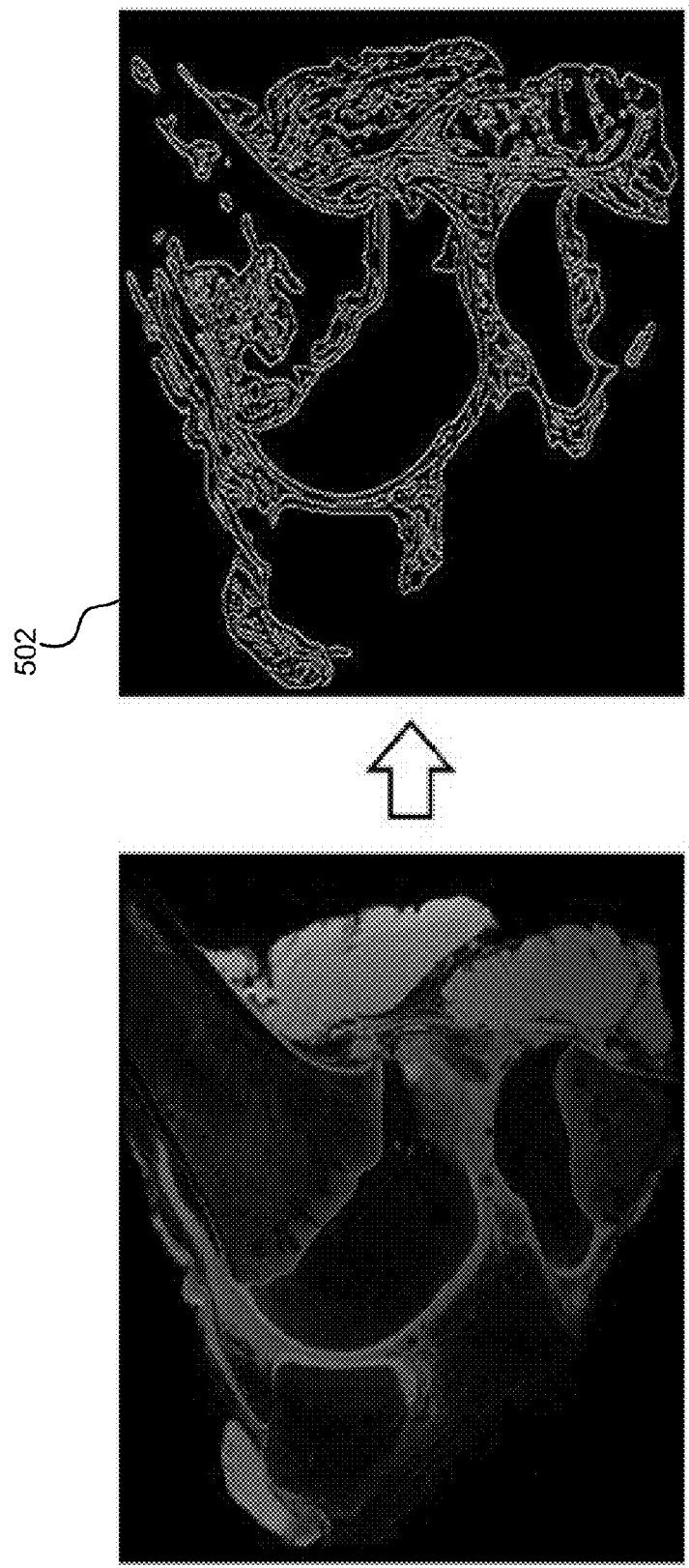
FIG. 5 is a graphical illustration of an application of an edge detection method.

In yet other aspects, images may be further pre-processed at process block 204 to create edge maps 502, as shown in FIG. 5, using for example, a Canny edge detection technique, as described in the reference by J. Canny ("A Computational Approach to Edge Detection" Pattern Analysis and Machine Intelligence, IEEE Transactions on PAMI-8(6): 679-698. 1986), in order to enhance detection of boundaries associated target biological tissues, such as articular joint tissues. In one example, pre-processing of noise removal in bony regions may take about 30 min for a set of 80 to 90 slices of MR images. However, in the case of larger slice thicknesses, this time can be reduced. Also, to expedite the pre-processing speed, every two (or more) slices can be averaged to reduce the number of slices.

Returning again to FIG. 2, for a target biological tissue associated with an image, at process block 206 a first point, or pivot point, may be identified within a target structure, such as a bony structure. Then, at process block 208, a second and third point may be identified, where each point is associated with extents of the target biological tissue. For example, in the case of a sagittal view of a knee region depicting an articular joint tissue, such as a femoral cartilage, the extents may include an anterior beginning point, or region, and posterior ending point, or region, of an articular joint tissue boundary. In some aspects, identification of any such points may be automatically generated using, for example, a system 100, as described, and may only entail slight or no adjustment from a user, while in other aspects, a user may select any or all three points.

Figures 6A, 6B:
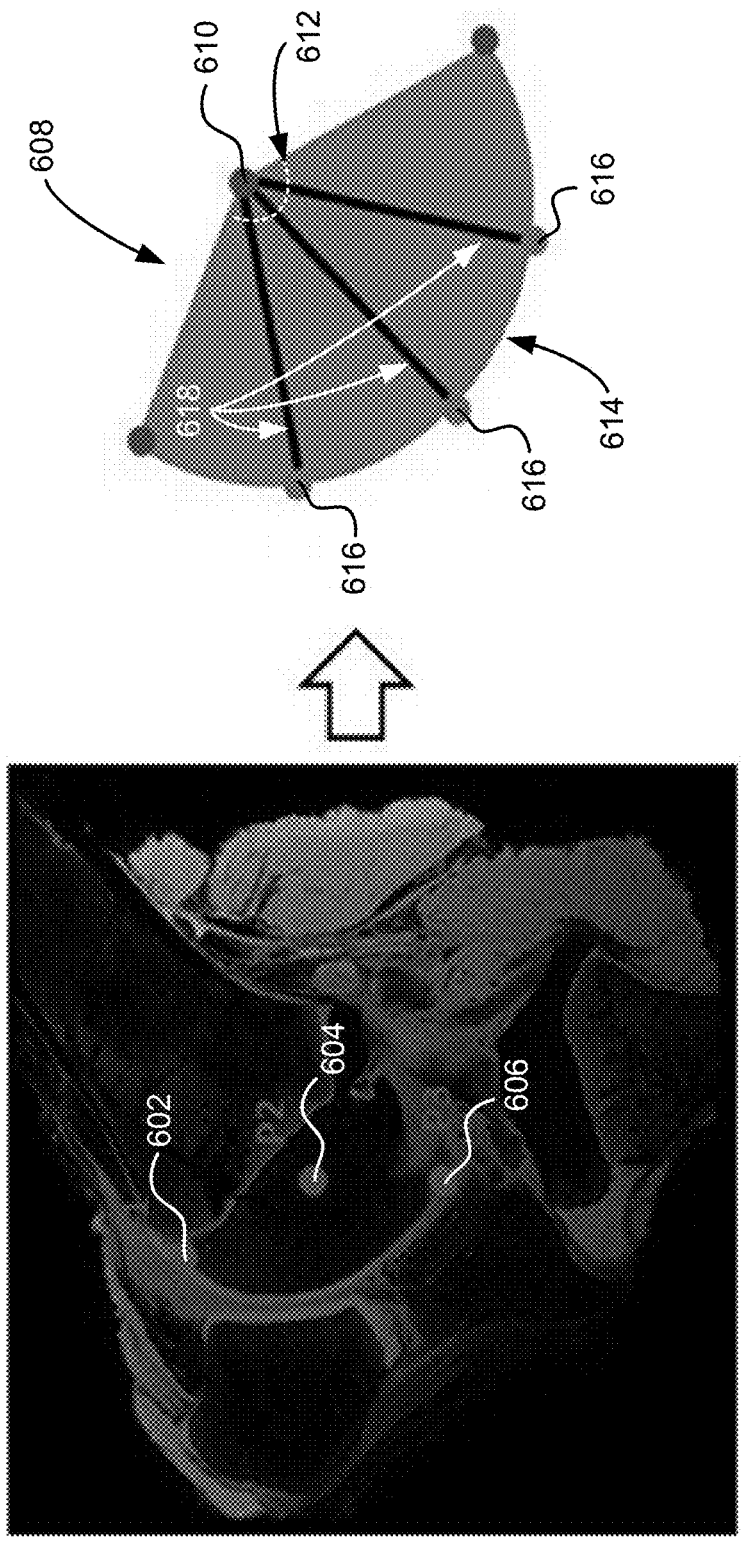
FIGS. 6A and 6B are a graphical illustration of a segmentation method in accordance with the present disclosure.

In addition, although identification, or selection, of pivot and boundary points has been described in a particular order via process blocks 206 and 208, they may be performed in any order. For example, one variation may include a user selecting a first, anterior beginning point 602, a second, pivot point 604, and a third, posterior ending point 606, as shown in FIG. 6A. Identified points at process blocks 206 and 208 may define a sector 608, as illustrated in the example of FIG. 6B. Specifically, the sector 608 may be described by a pivot point 610, a central angle 612, and a subtended arc 614.

Continuing with process 200 of FIG. 2, at process block 210 any number of arc points along a subtended arc of the sector defined by points identified at process blocks 206, 208, may be determined. In certain aspects, the arc points may be uniformly spaced along the subtended arc. Specifically referring to the example of FIG. 6B, determined arc points 616 are located along a subtended arc 614. Then, at process block 212 a number of linear segments may be extended, or radially projected, along directions determined by the pivot point and determined arc points. Referring again to FIG. 6B, linear segments 618 extending between the pivot point 610 and each arc point 616 are shown, dividing the sector 608 into multiple regions. In the case that arc points 616 are optionally determined to be spaced uniformly along the subtended arc 614, the linear segments 618 also divide the central angle 612 equally. Larger numbers of divisions will provide higher resolution but may slow down the detection process.

Figure 7:
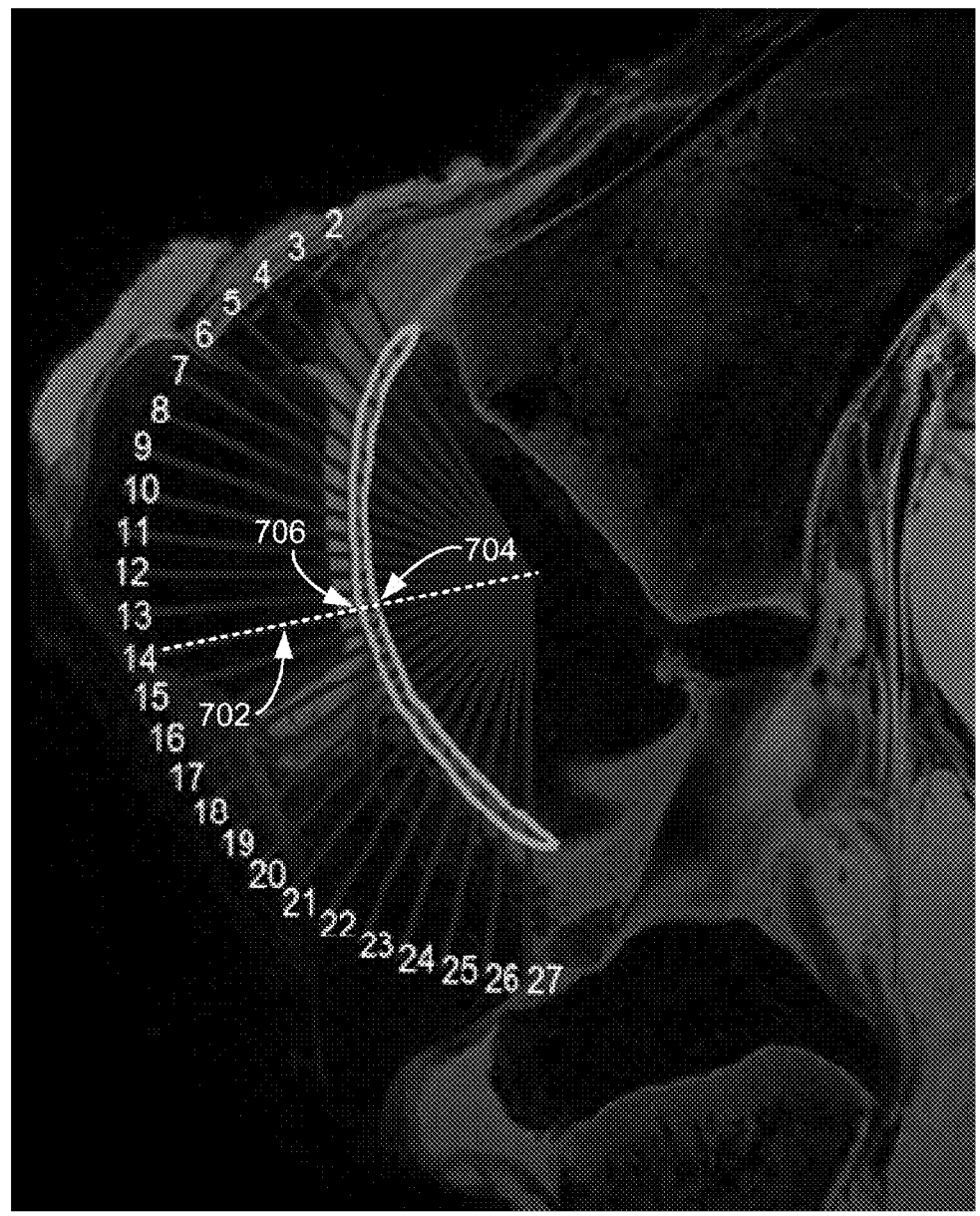
FIG. 7 is a graphical illustration showing construction of an example contour using the segmentation method of FIG. 6.

At process block 214 an intensity profile along each of the extended linear segments may be determined, to identify boundaries of a target biological tissue. Specifically, changes in pixel intensity along the linear segments are tracked and peak values are selected as the locations of boundaries. In particular, referring to an example shown FIG. 7, an intensity profile along linear segment 702 may determine an inner boundary point 704 and outer boundary point 706 of the target biological tissue. In some aspects, intensity profiles may be obtained from raw or processed images, including edge maps, as described. In this manner, multiple boundary points determined using each of the linear segments, along with identified extents, may be used at process block 216 to generate a contour of the target biological tissue.

At decision block 218, a check is made to determine whether all images have been processed. If not, process blocks 206-216 may be repeated for all received medical images to generate a number contours for one or more target biological tissues. As described, such contours may be utilized to generate a three-dimensional rendering or model of any target biological tissue. Similar to other segmentation approaches, a reduction in processing time involving multiple images may be achieved via a number of contour propagation or interpolation techniques. For example, contours may be generated, in a manner described, for every other image, or every few images. As such, for images not processed, contours may be generated based by averaging, shifting, interpolating, propagating, and so forth, contours of tissues or structures in the processed images. Similarly, pivot and/or boundary points identified at process blocks 206 and 208 from the processed images may be averaged, shifted, propagated, or interpolated to generate respective points for unprocessed images, thus reducing time spent providing manual point selection.

Figure 8:
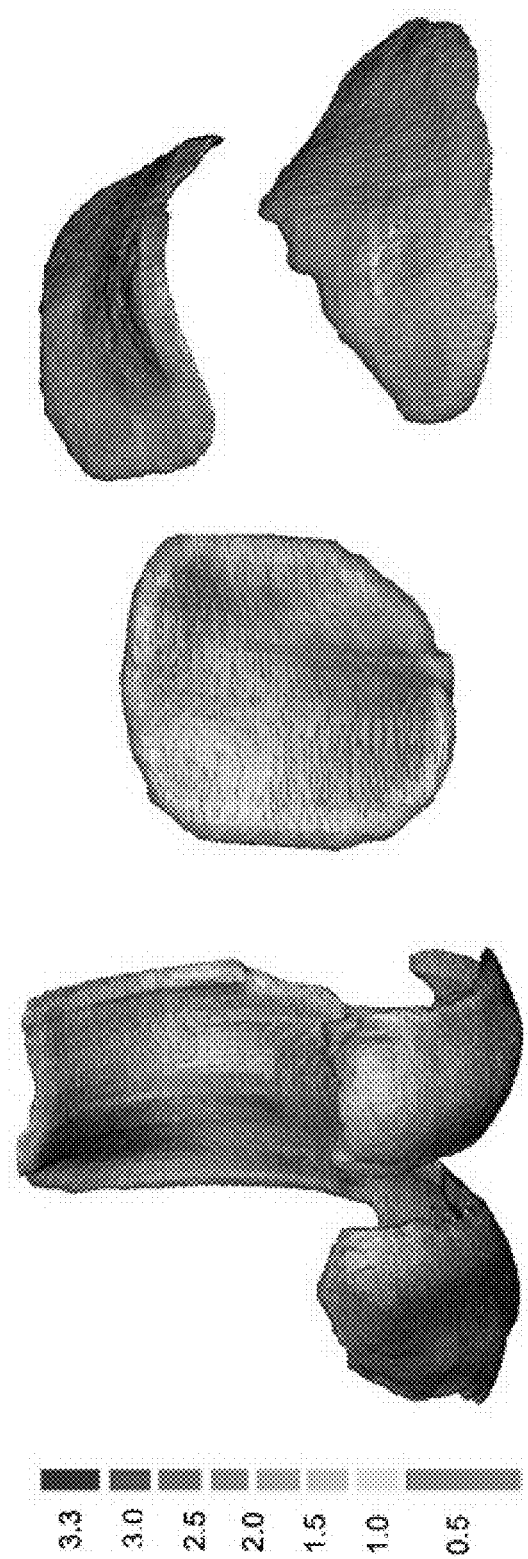
FIG. 8 is an example three-dimensional illustration of knee cartilage thickness obtained using a segmentation method in accordance with the present disclosure.

Finally, once all images or all desired images have been process, at process block 220 a report may be generated. The report may take a variety of shapes or forms. In some aspects, the report may include displaying single or multiple 2D images, such as MR images, that include contours, determined in accordance with the present disclosure, overlayed on the images. In other aspects, the report may include 3D renderings or models of any target biological tissue, such as a articular joint tissue, or structure, determined in accordance with the present disclosure. By way of example, FIG. 8 shows an image depicting femoral, patella and tibial cartilage, illustrating variability in cartilage thickness using a scale. In addition, the report may further provide information in relation to selected or determined regions, features or structures. For example, the report may include indication of a size, length, thickness, area, volume, and so on, of any structure or tissue, segmented in accordance with the present disclosure. Moreover, the report may further provide an indication of a target biological tissue condition using information, as described.

The present invention has been described in terms of one or more preferred embodiments, and it should be appreciated that many equivalents, alternatives, variations, and modifications, aside from those expressly stated, are possible and within the scope of the invention.

The invention claimed is:

1. A system for segmenting a medical image, the system comprising:
an input configured to receive medical image data acquired from at least a portion of a subject's anatomy;
at least one processor configured to:
i) accept a user selection, from the input, for a first point within a target structure identified on the image, and a second and a third point associated with extents of a target biological tissue, the first, second, and third points defining a sector described by the first point, a central angle, and a subtended arc;
ii) determine a plurality of arc points along the subtended arc;
iii) extend a plurality of linear segments along directions determined by the first point and the plurality of arc points;
iv) determine an intensity profile along each linear segment to identify boundaries of the target biological tissue;
v) generate a contour of the target biological tissue using the identified boundaries;
an output configured to display information related the contour of the target biological image.

2. The system of claim 1, wherein the at least one processor is further configured to apply a geodesic active contour segmentation technique to identify the target structure.

3. The system of claim 1, wherein the at least one processor is further configured to reduce interference signals associated with the target structure identified on the image.

4. The system of claim 1, wherein the target structure includes a bony structure.

5. The system of claim 1, wherein the target biological tissue includes an articular joint tissue.

6. The system of claim 5, wherein the articular joint tissue includes one of a femoral cartilage, a tibial cartilage, a patellar cartilage.

7. The system of claim 1, wherein the extents include an anterior region, and a posterior region.

8. The system of claim 1, wherein the at least one processor is further configured to determine the intensity profile by applying an edge detection technique to the image.

9. The system of claim 1, wherein at least one processor is further configured to repeat steps (i) through (v) for a plurality of received images to generate a plurality of contours of the target biological tissue.

10. The system of claim 9, wherein the at least one processor is further configured to generate a report indicative of at least a size of the target biological tissue using the plurality of contours.

11. A method for segmenting a medical image, the method comprising:

a) receiving an image acquired from at least a portion of a subject's anatomy;
b) identifying a first point within a target structure identified on the image;
c) identifying a second and a third point associated with extents of a target biological tissue, the first, second, and third points defining a sector described by the first point, a central angle, and a subtended arc;
d) determining a plurality of arc points along the subtended arc;
e) extending a plurality of linear segments along directions determined by the first point and the plurality of arc points;
f) determining an intensity profile along each linear segment to identify boundaries of the target biological tissue; and
g) generating a report indicating at least a contour of the target biological tissue using the identified boundaries.

12. The method of claim 11, wherein the method further comprises applying a geodesic active contour segmentation technique to identify the target structure.

13. The method of claim 11, wherein the method further comprises reducing interference signals associated with the target structure identified on the image.

14. The method of claim 11, wherein the target structure includes a bony structure.

15. The method of claim 11, wherein the target biological tissue includes an articular joint tissue.

16. The method of claim 15, wherein the articular joint tissue includes one of a femoral cartilage, a tibial cartilage, a patellar cartilage.

17. The method of claim 11, wherein the extents include an anterior region, and a posterior region.

18. The method of claim 11, wherein determining the intensity profile further comprises applying an edge detection technique to the image.

19. The method of claim 11, wherein the method further comprises repeating steps (a) through (g) for a plurality of images to generate a plurality of contours of the target biological tissue.

20. The method of claim 19, wherein the report includes information about at least a size and a condition of the target biological tissue using the plurality of contours.

21. A non-transitory, computer-readable storage medium having stored thereon instructions that, when executed by a computer processor, cause the computer processor to generate a medical image by carrying out steps comprising:

a) receiving image data acquired from at least a portion of a subject's anatomy;
b) using the image data, denoting a first point within a bony structure;
c) using the image data, denoting a second and a third point associated with extents of an articular joint tissue, the first, second, and third points defining a sector described by the first point, a central angle, and a subtended arc;
d) determining a plurality of arc points along the subtended arc;
e) extending a plurality of linear segments along directions determined by the first point and the plurality of arc points;
f) determining an intensity profile along each linear segment to identify boundaries of the articular joint tissue; and
g) generating at least one medical image of the subject's anatomy indicating at least a contour of the articular joint tissue using the identified boundaries.

22. The storage medium of claim 21, wherein the method further comprises repeating steps (a) through (g) for a plurality of images to generate a plurality of contours of the articular joint tissue.

* * * * *